United States Patent
Gruber

(10) Patent No.: US 8,114,376 B2
(45) Date of Patent: *Feb. 14, 2012

(54) MULTISTAGE METHOD FOR MANUFACTURING TITANIUM DIOXIDE

(75) Inventor: Rainer Gruber, Leverkusen (DE)

(73) Assignee: Kronos International, Inc., Leverkusen (DE)

( * ) Notice: Subject to any disclaimer, the term of this patent is extended or adjusted under 35 U.S.C. 154(b) by 292 days.

This patent is subject to a terminal disclaimer.

(21) Appl. No.: 12/238,693

(22) Filed: Sep. 26, 2008

(65) Prior Publication Data

US 2009/0098041 A1 Apr. 16, 2009

Related U.S. Application Data

(60) Provisional application No. 60/979,448, filed on Oct. 12, 2007.

(30) Foreign Application Priority Data

Oct. 12, 2007 (DE) .......... 10 2007 049 296

(51) Int. Cl.
*C01G 23/047* (2006.01)

(52) U.S. Cl. ........ 423/612; 423/610; 423/613; 106/436; 106/437

(58) Field of Classification Search .......... 423/610–613; 106/436–437
See application file for complete search history.

(56) References Cited

U.S. PATENT DOCUMENTS

| | | | | |
|---|---|---|---|---|
| 2,957,753 A | * | 10/1960 | Nelson et al. | ................. 423/613 |
| 4,053,577 A | | 10/1977 | Arkless | |
| 4,803,056 A | | 2/1989 | Morris et al. | |
| 5,840,112 A | * | 11/1998 | Morris et al. | ................. 106/442 |
| 6,387,347 B1 | | 5/2002 | Deberry et al. | |
| 2007/0172414 A1 | | 7/2007 | Subramanian et al. | |

FOREIGN PATENT DOCUMENTS

| | | | |
|---|---|---|---|
| EP | 0583063 | | 7/1993 |
| EP | 0852568 | | 2/1998 |
| EP | 1683763 A1 | * | 7/2006 |
| GB | 1064569 | | 4/1967 |
| GB | 2037266 | | 7/1980 |
| WO | WO 01/60748 | | 8/2001 |
| WO | 2007/050682 | | 5/2007 |
| WO | 2008/036534 | | 3/2008 |

* cited by examiner

*Primary Examiner* — Stuart Hendrickson
*Assistant Examiner* — Richard M Rump
(74) *Attorney, Agent, or Firm* — Locke Lord, LLP

(57) ABSTRACT

The manufacture of titanium dioxide by oxidation of titanium tetrachloride in a multistage method, where both oxygen and titanium tetrachloride are added in several stages. In the first stage gaseous $TiCl_4$ is introduced into a preheated oxygen-containing gaseous stream in a stoichiometric or hyper-stoichiometric amount to produce a $TiO_2$ containing gas suspension. In the second or further stages liquid $TiCl_4$ and oxygen-containing gas is introduced into the $TiO_2$ containing gas suspension to produce further $TiO_2$.

7 Claims, No Drawings

MULTISTAGE METHOD FOR MANUFACTURING TITANIUM DIOXIDE

RELATED APPLICATIONS

This application claims the benefit of U.S. Provisional Patent Application Ser. No. 60/979,448 filed Oct. 12, 2007, and entitled "Multistage Method to Make Titanium Dioxide" and the benefit of DE 10 2007 049 296.2 filed Oct. 12, 2007.

TECHNICAL FIELD OF THE INVENTION

The invention relates to the manufacture of titanium dioxide by oxidation of titanium tetrachloride in a multistage method, where both oxygen and titanium tetrachloride are added in several stages.

BACKGROUND OF THE INVENTION

In one of the commercially used methods for manufacturing titanium dioxide pigment particles, known as the chloride process, titanium tetrachloride ($TiCl_4$) is reacted with an oxidizing gas, such as oxygen, air, etc., and with certain additives in a tubular reactor to form titanium dioxide and chlorine gas:

$$TiCl_4 + O_2 \rightarrow TiO_2 + 2\,Cl_2$$

The $TiO_2$ particles are subsequently separated from the chlorine gas. Known additives are $AlCl_3$ as a rutilizing agent and steam or alkali salts as a nucleating agent.

The oxidation process is customarily performed in one stage, i.e. the reaction components (educts), oxygen and gaseous titanium tetrachloride, are each added at only one inlet point of the reactor. Owing to the high activation energy of $TiCl_4$ oxidation, the educts must, before addition, be heated to such a degree that an adiabatic mixed temperature of at least approx. 740° C. is reached. The oxidation reaction is highly exothermal, meaning that an adiabatic reaction temperature of approx. 1,850° C. is reached following complete conversion. Before the pigment produced is separated from the gas mixture in a filter, this mixture has to be cooled to a maximum of 450° C. in order to avoid damage to the filter. This process is energetically unsatisfactory because large amounts of heat are dissipated into the cooling-water system. Single-stage oxidation is also disadvantageous in terms of product quality, since the extensive hot zone for oxidation promotes the formation of hard $TiO_2$ aggregates.

Consequently, there are various developments in the prior art for operating the process on a multistage basis. According to GB 1 064 569, both $TiCl_4$ and $O_2$ are added in two stages, in which context the respective quantity of $O_2$ is sufficient for completely oxidizing the respective quantity of $TiCl_4$.

The teaching according to U.S. Pat. No. 4,053,577 provides for a maximum of one of the educts to be introduced into the reactor in two stages.

In the methods according to GB 2 037 266, U.S. Pat. No. 4,803,056 and EP 0 583 063 B1, gaseous $TiCl_4$ is introduced into a hot oxygen stream in two or more stages.

The method according to EP 0 852 568 B1 provides for not only the $TiCl_4$ to be added in two stages, but also the oxygen. However, the object of this method is effective control of the mean $TiO_2$ particle size, and thus of the tone of the $TiO_2$ pigment base material. In this case, $TiCl_4$ vapour having a temperature of about 400° C. is first fed into an oxygen stream with a temperature of about 950° C. The $TiO_2$ particles are formed, and particle growth takes place, in the downstream reaction zone. $TiCl_4$ vapour heated to a lesser extent (approx. 180° C.) is added at a second inlet point. Oxygen having a temperature between 25° C. and 1,040° C. is introduced at the second inlet point, the temperature of the mixture being sufficient to initiate the reaction.

The multi-stage method according to U.S. Pat. No. 6,387,347 is additionally said to reduce agglomeration. To this end, the previously heated, gaseous $TiCl_4$ stream is split into two part streams before addition to the reactor. One part stream is oxidized in the first stage of the reactor. The second part stream is cooled by injection of liquid $TiCl_4$ (de-superheating) and then added to the reactor. De-superheating takes place outside the reactor, the temperature not falling below the condensation temperature of the overall stream.

US 2007/0172414 A1 discloses a multistage method for the reaction of $TiCl_4$ and $O_2$ in which gaseous $TiCl_4$ is fed into the reactor in the first stage, and liquid $TiCl_4$ in the second stage and wherein the oxygen is present in a hyper-stoichiometric amount in the first stage. This method permits energy savings and improvement of the particle size range.

SUMMARY OF THE INVENTION

The present invention for manufacturing titanium dioxide by oxidation of titanium tetrachloride permits further energy savings compared to the methods known from the prior art.

The present method for manufacturing titanium dioxide by a multistage reaction of titanium tetrachloride with oxygen in a reactor includes:
a) Introduction of gaseous $TiCl_4$ into a preheated, oxygen-containing gaseous stream in a first reaction zone of the reactor, where the molar ratio of $TiCl_4$:$O_2$ in the reaction zone is at least 1, and formation of a gas suspension containing $TiO_2$,
b) Passing of the gas suspension containing $TiO_2$ into at least one further reaction zone, and
c) Introduction of an oxygen-containing gas and liquid $TiCl_4$ into the at least one further reaction zone and further formation of $TiO_2$ in the gas suspension.

The present method for manufacturing titanium dioxide by a multistage reaction of titanium tetrachloride with oxygen in a reactor includes:
a) Introduction of a gaseous mixture of $TiCl_4$ and an oxygen-containing gas into a preheated, oxygen-containing gaseous stream in a first reaction zone of the reactor, where the molar ratio of $TiCl_4$:$O_2$ in the reaction zone is at least 1, and formation of a gas suspension containing $TiO_2$,
b) Passing of the gas suspension containing $TiO_2$ into at least one further reaction zone, and
c) Introduction of an oxygen-containing gas and liquid $TiCl_4$ into the at least one further reaction zone and further formation of $TiO_2$ in the gas suspension.

DESCRIPTION OF THE PREFERRED EMBODIMENTS

The method according to the present invention differs from the aforementioned multistage chloride processes for manufacturing titanium dioxide from the prior art in that the $TiCl_4$ is added in gaseous form and stoichiometrically or in excess in relation to the oxygen in the first stage, and in liquid form and sub-stoichiometrically in the second and further stages.

In step a, $TiCl_4$ and $O_2$ react in a first reaction zone of the reactor and form a gas suspension containing $TiO_2$ (first stage). In step b, the gas suspension containing $TiO_2$ is passed into at least one further reaction zone. In step c, oxygen-containing gas and liquid $TiCl_4$ is introduced into the at least one further reaction zone and further $TiO_2$ is formed in the gas suspension (second stage).

The present method can be performed in two stages or more than two stages. In the first stage (step a) the temperature of the preheated oxygen-containing gas is at least about 950° C. In the second or further stages (step c) in one embodiment of the method the oxygen-containing gas is introduced with a temperature of at least about 200° C.

In a further embodiment of the present method, the oxygen-containing gas added in the at least one further stage (step c) is "cold", i.e. it has a temperature of less than about 50° C., for example a temperature of about 30° C. This method leads to a further improvement in energy efficiency, since only the portion of the oxygen-containing gas that is required for the first stage needs to be heated in order to provide the activation energy for the reaction. In all other stages, the activation energy is provided by the reaction enthalpy of $TiCl_4$ oxidation released in the upstream stages.

In another embodiment of the present method in step a the gaseous $TiCl_4$ is introduced into the reactor mixed with an oxygen-containing gas. Preferably, the $O_2$-content of the gaseous mixture is about 20 vol. % maximum. In order to avoid a premature reaction of the components in the gaseous mixture the temperature of the gaseous mixture must not exceed about 900° C. The introduction of the gaseous $TiCl_4$ mixed with oxygen-containing gas helps to prevent the formation of defects in the $TiO_2$ structure and leads to improved brightness of the manufactured $TiO_2$ pigment.

The present method may be performed in, for example, a cylindrical plug flow reactor.

The example described below is an exemplary embodiment of the present invention and not to be taken as restricting the present invention.

The method is performed in two stages, where the $TiCl_4$ is added in equal quantities in the first and second stages. In the first stage, the temperature of the oxygen-containing gas stream is about 1,650° C., that of the gaseous $TiCl_4$ introduced being about 450° C. The molar ratio of $TiCl_4:O_2$ in the first reaction zone is about 1. Downstream of the first stage, at a point where the reaction of the first stage has taken place completely, an oxygen-containing gas is added first, followed by liquid $TiCl_4$. The $TiCl_4$ is split between the first and second stages at a ratio of about 1:1. In the second stage, the temperature of the oxygen-containing gas introduced is about 30° C., that of the liquid $TiCl_4$ introduced likewise being about 30° C.

Compared to the customary, one-stage method, the same temperatures are selected in the first combustion stage in this embodiment of the method according to the present invention, but major energy savings result when preheating the educts owing to the substantially smaller quantities of oxygen-containing gas and $TiCl_4$ to be heated in the first stage. However, in the second stage the educts do not have to be preheated. The total savings achieved correspond about to the ratio at which the $TiCl_4$ is split up over the two stages, i.e. about 50% in the present example.

It is to be understood that the present invention also includes the addition, familiar to the person skilled in the art, of additives for rutilization (e.g. $AlCl_3$) and for nucleation (e.g. alkali salts) in the reaction zones.

The invention claimed is:

1. A method for manufacturing titanium dioxide by a multistage reaction of titanium tetrachloride with oxygen in a reactor, comprising:
    a) introducing gaseous $TiCl_4$ into a preheated, oxygen-containing gaseous stream having a temperature at least about 950° C. in a first reaction zone of the reactor, where the molar ratio of $TiCl_4:O_2$ in the reaction zone is greater than 1, and forming a gas suspension containing $TiO_2$;
    b) passing of the gas suspension containing $TiO_2$ and unreacted $TiCl_4$ into at least one further reaction zone of the reactor; and
    c) introducing an oxygen-containing gas at a temperature below about 50° C. and liquid $TiCl_4$ into the at least one further reaction zone of the reactor, where the molar ratio of $TiCl_4:O_2$ added to the further reaction zone is less than 1, and further formation of $TiO_2$ in the gas suspension.

2. The method of claim 1, wherein the oxygen-containing gas is introduced first in step c, followed by introducing $TiCl_4$ into the reactor.

3. The method of claim 1, wherein the further reaction zone is located at a point in the reactor where the reaction according to step a has taken place completely.

4. A method for manufacturing titanium dioxide by a multistage reaction of titanium tetrachloride with oxygen in a reactor, comprising:
    a) introducing a gaseous mixture of $TiCl_4$ and an oxygen-containing gas into a preheated, oxygen-containing gaseous stream having a temperature at least about 950° C. in a first reaction zone of the reactor, where the molar ratio of $TiCl_4:O_2$ in the reaction zone is greater than 1, and formation of a gas suspension containing $TiO_2$;
    b) passing of the gas suspension containing $TiO_2$ and unreacted $TiCl_4$ into at least one further reaction zone; and
    c) introducing an oxygen-containing gas at a temperature below about 50° C. and liquid $TiCl_4$ into the at least one further reaction zone, where the molar ratio of $TiCl_4:O_2$ added to the further reaction zone is less than 1, of the reactor and further forming $TiO_2$ in the gas suspension.

5. The method of claim 4, wherein in step a the maximum oxygen content of the gaseous mixture is about 20 vol.%.

6. The method of claim 5, wherein in step a the gaseous mixture displays a maximum temperature of about 900 ° C.

7. The method of claim 4 wherein in step a the gaseous mixture displays a maximum temperature of about 900° C.

* * * * *